US008026919B2

(12) United States Patent
Aoki (10) Patent No.: US 8,026,919 B2
(45) Date of Patent: Sep. 27, 2011

(54) DISPLAY CONTROLLER, GRAPHICS PROCESSOR, RENDERING PROCESSING APPARATUS, AND RENDERING CONTROL METHOD (75) Inventor: Sachiyo Aoki, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 160 days.

(21) Appl. No.: 12/297,546

(22) PCT Filed: Nov. 30, 2006

(86) PCT No.: PCT/JP2006/323950
§ 371 (c)(1),
(2), (4) Date: Oct. 17, 2008

(87) PCT Pub. No.: WO2007/122769
PCT Pub. Date: Nov. 1, 2007

(65) Prior Publication Data
US 2009/0225088 A1    Sep. 10, 2009

(30) Foreign Application Priority Data

Apr. 19, 2006   (JP) .................................. 2006-116069

(51) Int. Cl.
*G06F 15/00* (2006.01)
*G09G 5/399* (2006.01)
(52) U.S. Cl. ......... 345/501; 345/503; 345/536; 345/539
(58) Field of Classification Search .................. 345/501, 345/503, 536, 539
See application file for complete search history.

(56) References Cited

U.S. PATENT DOCUMENTS

| 5,081,449 | A | | 1/1992 | Kurosu et al. | |
|---|---|---|---|---|---|
| 5,657,478 | A | * | 8/1997 | Recker et al. | 345/503 |
| 6,046,709 | A | * | 4/2000 | Shelton et al. | 345/1.1 |
| 6,072,498 | A | * | 6/2000 | Brittain et al. | 345/428 |
| 6,271,866 | B1 | * | 8/2001 | Hancock et al. | 345/544 |
| 6,304,297 | B1 | * | 10/2001 | Swan | 348/556 |
| 6,407,736 | B1 | * | 6/2002 | Regan | 345/422 |

(Continued)

FOREIGN PATENT DOCUMENTS

JP   64086193 A   3/1989

(Continued)

OTHER PUBLICATIONS

International Search Report and Written Opinion for International PCT application PCT/JP2006/323950. International Preliminary Report on Patentability for International PCT application PCT/JP2006/323950.
JP Office action dated Mar. 4, 2008.
Japanese Office Action for corresponding Japanese Patent application No. 2006-116069, Mar. 3, 2009.

*Primary Examiner* — Daniel Washburn
(74) *Attorney, Agent, or Firm* — Matthew B. Dernier, Esq.; Gibson & Dernier LLP (57) ABSTRACT A rendering processing unit of a graphics processor selects a buffer in a frame buffer in which to write rendering data by switching between multiple buffers in the frame buffer and writes rendering data accordingly; a display controller selects a buffer in the frame buffer from which to read rendering data by switching between a plurality of buffers in the frame buffer according to a sequence, and supplies the rendering data read by scanning the frame buffer to a display; a switching signal generating unit generates a buffer switching signal for directing the display controller to switch the buffer in the frame buffer from which to read at a frequency different from a vertical synchronization frequency of the display assumed by the graphics processor.

7 Claims, 11 Drawing Sheets

U.S. PATENT DOCUMENTS

| | | | |
|---|---|---|---|
| 6,809,733 B2 * | 10/2004 | Mukherjee et al. | 345/504 |
| 6,853,381 B1 * | 2/2005 | Grigor et al. | 345/531 |
| 6,894,693 B1 * | 5/2005 | Nash | 345/552 |
| 6,894,695 B2 * | 5/2005 | vanWelzen | 345/582 |
| 6,938,176 B1 * | 8/2005 | Alben et al. | 713/323 |
| 7,425,962 B2 * | 9/2008 | Alcorn et al. | 345/556 |
| 7,477,256 B1 * | 1/2009 | Johnson | 345/504 |
| 2002/0034377 A1 * | 3/2002 | Numata | 386/111 |
| 2002/0190994 A1 * | 12/2002 | Brown | 345/539 |
| 2003/0233592 A1 * | 12/2003 | Lin et al. | 713/320 |
| 2005/0268141 A1 * | 12/2005 | Alben et al. | 713/500 |
| 2005/0271361 A1 * | 12/2005 | Aoki et al. | 386/68 |
| 2006/0271717 A1 * | 11/2006 | Koduri et al. | 710/241 |

FOREIGN PATENT DOCUMENTS

| | | |
|---|---|---|
| JP | 01222297 | 5/1989 |
| JP | 1252995 A | 10/1989 |
| JP | 2181876 A | 7/1990 |
| JP | 5249935 A | 9/1993 |
| JP | 08095538 | 4/1996 |
| JP | 8305540 A | 11/1996 |

* cited by examiner

DISPLAY CONTROLLER, GRAPHICS PROCESSOR, RENDERING PROCESSING APPARATUS, AND RENDERING CONTROL METHOD

TECHNICAL FIELD

The present invention relates to a rendering process technology and, more particularly, to a display controller, graphics processor, rendering processing apparatus, and rendering control method adapted to generate image data suitable for a display.

BACKGROUND ART

With the improvement in technology of manufacturing thin displays such as liquid crystal displays and reduction in prices, an extensive variety of display devices are currently available. A display device may display high-quality videos played back by a DVD player or moving images produced by computer graphics.

To display image data output from a computer or a DVD player on a display device, there is needed a display controller having the capabilities for converting an image signal into a format compatible with the specification of the display device by converting the horizontal frequency or the vertical frequency of the image signal.

The specification (e.g., frame rate and resolution) of an image signal that can be displayed differs depending on the type of the display device. The display controller converts an image signal in adaption to the specification of a display device to which the signal is output. The rate of the vertical synchronizing signal of the NTSC television system is 59.97 Hz and the rate of the vertical synchronizing signal of the PAL television system is 50 Hz. Therefore, in order to display moving images provided in the NTSC format on a television of the PAL system, the frame rate of the moving images is converted to adapt to the PAL system.

A rendering process assuming the NTSC system intrinsically produces frames of moving images at 59.97 Hz. Displaying the moving images on a display operated at a frequency different from the frequency of the rendering process will cause a problem and the quality of moving images as reproduced suffers.

In this background, a general purpose of the present invention is to provide a rendering process technology for displaying moving images on a display device operated at a synchronization frequency different from the frequency of the rendering process.

SUMMARY OF THE INVENTION

A display controller adapted to solve the aforementioned problem is operative to select one of a plurality of frame buffers, each of which is adapted to hold a frame of rendering data, by switching between the frame buffers according to a sequence, and to supply the rendering data read by scanning the selected frame buffer to a display, wherein the display controller switches between the frame buffers at a frequency different from a vertical synchronization frequency of the display. The frequency at which the display controller switches between the frame buffers may be a vertical synchronization frequency assumed by a graphics processor when generating the rendering data frame by frame. The display controller may receive from the graphics controller a buffer switching signal generated at the assumed vertical synchronization frequency and control the timing of switching between the frame buffers according to the buffer switching signal.

Another aspect of the present invention relates to a graphics processor. The graphics processor is adapted for a display controller operative to select one of a plurality of frame buffers, each of which is adapted to hold a frame of rendering data, by switching between the frame buffers according to a sequence, and to supply the rendering data read by scanning the selected frame buffer to a display, wherein the graphics processor supplies a buffer switching signal for timing the switching between the frame buffers and generates the buffer switching signal at a vertical synchronization frequency assumed by the graphics processor when generating the rendering data frame by frame.

Still another aspect of the present invention relates to a rendering processing apparatus. The apparatus comprises: a plurality of frame buffers each of which is operative to hold a frame of rendering data; a rendering processing unit operative to select a frame buffer in which to write the rendering data, by switching between the plurality of frame buffers according to a sequence, and to generate the rendering data in the selected frame buffer in which to write; a display controller operative to select a frame buffer from which to read rendering data by switching between the plurality of buffers according to a sequence, and to supply to a display the rendering data read by scanning the selected frame buffer from which to read; and a switching signal generating unit operative to generate a buffer switching signal directing the display controller to switch the frame buffer from which to read. The switching signal generating unit generates the buffer switching signal at a frequency different from a vertical synchronization frequency of the display.

Yet another aspect of the present invention relates to a rendering processing apparatus. The apparatus comprises: a plurality of frame buffers each of which is operative to hold a frame of rendering data; a rendering processing unit operative to select a frame buffer in which to write the rendering data, by switching between the plurality of frame buffers according to a sequence, and to generate the rendering data in the selected frame buffer in which to write; a display controller operative to select a frame buffer from which to read rendering data by switching between the plurality of buffers according to a sequence, and to supply to a display the rendering data read by scanning the selected frame buffer from which to read; and a switching signal generating unit operative to generate a buffer switching signal directing the display controller to switch the frame buffer from which to read. The switching signal generating unit determines whether a vertical synchronization frequency assumed by the rendering processing unit when generating the rendering data frame by frame matches an actual vertical synchronization frequency of the display, generates, when the frequencies do not match, the buffer switching signal at the assumed vertical synchronization frequency, and generates, when the frequencies match, the buffer switching signal at the actual vertical synchronization frequency of the display.

Yet another aspect of the present invention relates to a rendering control method. The method is adapted for a display controller operative to select one of a plurality of frame buffers, each of which is adapted to hold a frame of rendering data, by switching between the frame buffers according to a sequence, and to supply the rendering data read by scanning the selected frame buffer to a display, wherein the timing of switching the frame buffer scanned by the display controller is controlled in accordance with a buffer switching signal generated at a frequency different from a vertical synchronization frequency of the display.

Optional combinations of the aforementioned constituting elements, and implementations of the invention in the form of methods, apparatuses, systems, computer programs, data structures, and recording mediums may also be practiced as additional modes of the present invention.

[Advantage Of The Present Invention]

The present invention is readily applicable to a display device operated at a different synchronization frequency.

DESCRIPTION OF THE REFERENCE NUMERALS 10 main processor, 20 main memory, 30 graphics processor, 32 rendering processing unit, 36 switching signal generating unit, 40 local memory, 44 frame buffer, 50 display controller, 60 display, 80 communication unit, 100 rendering processing apparatus.

DETAILED DESCRIPTION OF THE INVENTION

Figure 1:
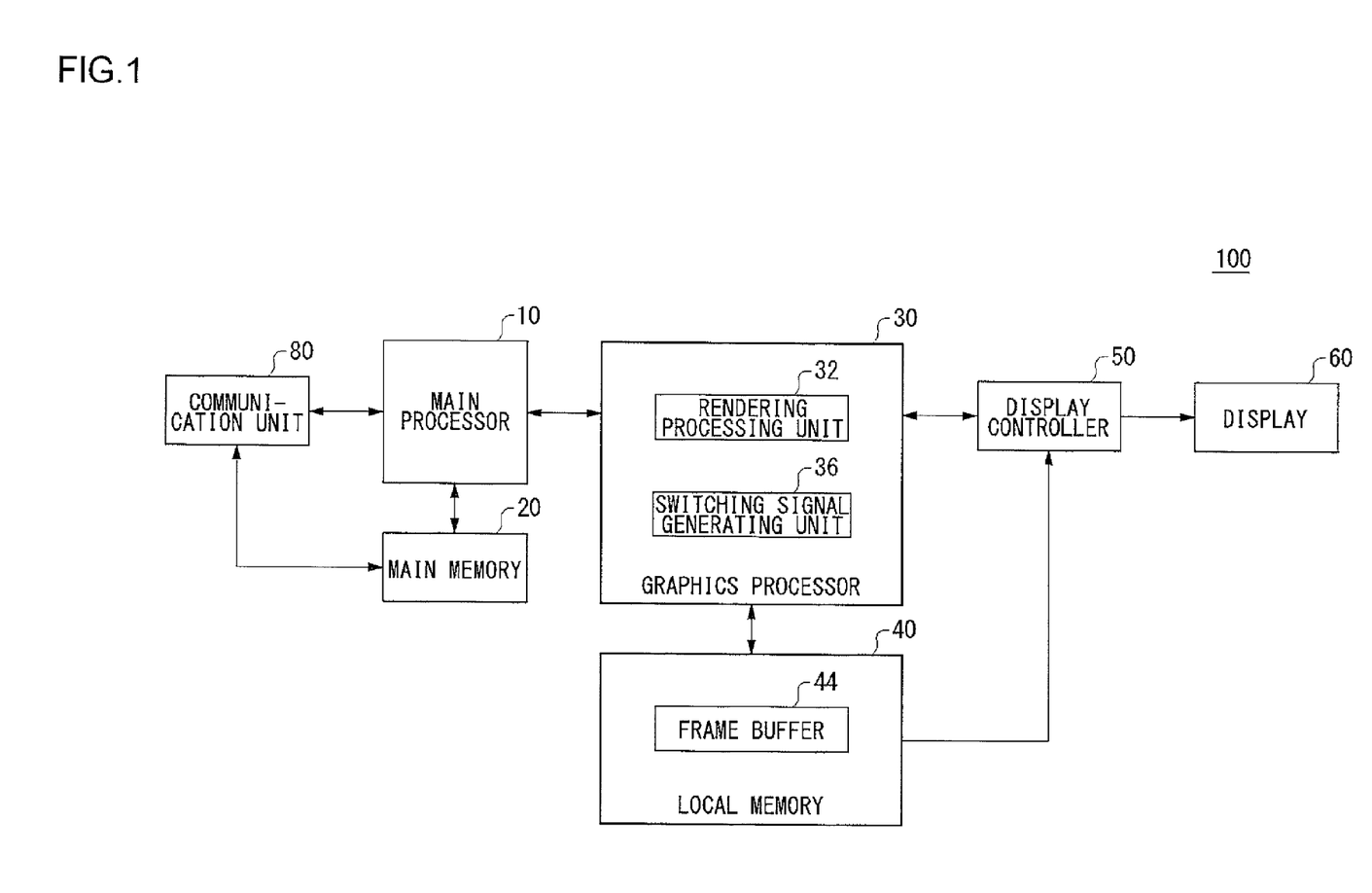
FIG. 1 shows the structure of a rendering processing apparatus according to an embodiment of the present invention.

FIG. 1 shows the structure of a rendering processing apparatus 100 according to an embodiment of the present invention. The rendering processing apparatus 100 performs a rendering process for generating rendering data to be displayed on a screen, based on three-dimensional model information of an object to be rendered (hereinafter, simply referred to as "an object"). The figure is a block diagram depicting the respective functions. The functional blocks may be implemented in a variety of manners by hardware only, software only, or a combination thereof.

The rendering processing apparatus 100 includes a main processor 10, a main memory 20, a graphics processor 30, a local memory 40, a display controller 50, a display 60, and a communication unit 80. These components are connected to a bus (not shown).

The main memory 20 is a storage primarily used by the main processor 10 and stores vertex data and control parameters of an object.

The main processor 10 performs geometry processing for an object and generates a rendering command directing the graphics processor 30 to render an object.

The local memory 40 is a storage area primarily used by the graphics processor 30 and stores a shader program for executing a rendering algorithm, a texture to be mapped onto the surface of an object, etc. A frame buffer to hold intermediate and final results of rendering is provided in the local memory 40.

The graphics processor 30 renders an object so as to generate rendering data and stores the rendering data in the local memory 40. The graphics processor 30 includes a rendering processing unit 32 and a switching signal generating unit 36.

The rendering processing unit 32 performs arithmetic operations to render an object such as shading, texture mapping, etc. in accordance with the rendering command provided by the main processor 10. The unit 32 writes the rendering data in a frame buffer 44 in the local memory 40. The rendering processing unit 32 includes functional blocks such as a rasterizer, a shader unit, a texture unit, etc. (not shown).

The frame buffer 44 is configured as a multibuffer such as a double buffer or a triple buffer so that operations for writing and reading rendering data can be performed independently. Rendering data for a subsequent frame is written in a buffer separate from the buffer being read by the display controller 50. The display controller 50 switches between multiple buffers in the frame buffer 44 according to a sequence in synchronization with an actual vertical synchronization frequency (also called "a refresh rate") of the display 60 or a vertical synchronization frequency assumed by the graphics processor 30, and scans the selected buffer accordingly.

The display controller 50 generates a vertical synchronizing signal (VSYNC) in accordance with the vertical synchronization frequency of the display 60 and supplies the signal to the switching signal generating unit 36 of the graphics processor 30.

The switching signal generating unit 36 is supplied with the vertical synchronizing signal of the display 60 from the display controller 50 so as to generate a buffer switching signal directing switching between buffers in the frame buffer 44 formed as a multibuffer and to supply the signal to the display controller 50.

The switching signal generating unit 36 determines whether the actual vertical synchronization frequency of the display 60 matches the vertical synchronization frequency assumed by the graphics processor 30 when generating rendering data frame by frame. When the frequencies match, the unit 36 generates a buffer switching signal at the actual vertical synchronization frequency of the display 60. When the actual vertical synchronization frequency of the display 60 differs from the vertical synchronization frequency assumed by the graphics processor 30, the switching signal generating unit 36 generates a buffer switching signal at the vertical synchronization frequency assumed by the graphics processor 30 instead of the actual vertical synchronization frequency of the display 60.

The display controller 50 is timed by a buffer switching signal supplied from the switching signal generating unit 36 to switchably select the buffer in the frame buffer 44 formed as a multibuffer. The controller 50 scans the selected buffer so as to read out the rendering data.

The operation of scanning the frame buffer 44 by the display controller 50 will be described in further detail. The display controller 50 sequentially reads pixel data of rendering data line by line from the frame buffer 44. In other words, the display controller 50 scans the frame buffer 44 horizontally, starting at the pixel at the top left corner, so as to read out pixel data of the first row. The controller 50 then moves up or down by one pixel and reads pixels in the subsequent row. When the pixel array in the bottom row has been scanned, the controller 50 starts a similar scan from the pixel array in the topmost row again.

Since the frame buffer 44 is formed as a multibuffer, the switching signal generating unit 36 supplies a buffer switching signal to the display controller 50 at the actual vertical synchronization frequency of the display 60 or the vertical synchronization frequency assumed by the graphics processor 30, so as to control the display controller 50 to switch the frame buffer from which to scan rendering data. The display controller 50 is timed by a switching signal from the switching signal generating unit 36 to suspend the operation of reading the pixel array from the first frame buffer that had been scanned. The controller 50 switches from the first buffer to the second buffer and reads out the next pixel array from the second frame buffer.

The display controller 50 converts image data for display comprising RGB color values and read from the frame buffer 44 into an image signal of a format compatible with the display 60. The controller 50 supplies the converted signal to the display 60.

The graphics processor 30 and the main processor 10 are connected via an input and output interface (not shown). The graphics processor 30 is capable of accessing the main memory 20 via the input and output interface. The main processor 10 is capable of accessing the local memory 40 via the input and output interface.

The communication unit 80 is capable of transmitting and receiving data over a network in accordance with an instruction from the main processor 10. The data transmitted and received by the communication unit 80 is held in the main memory 20.

Figure 2:
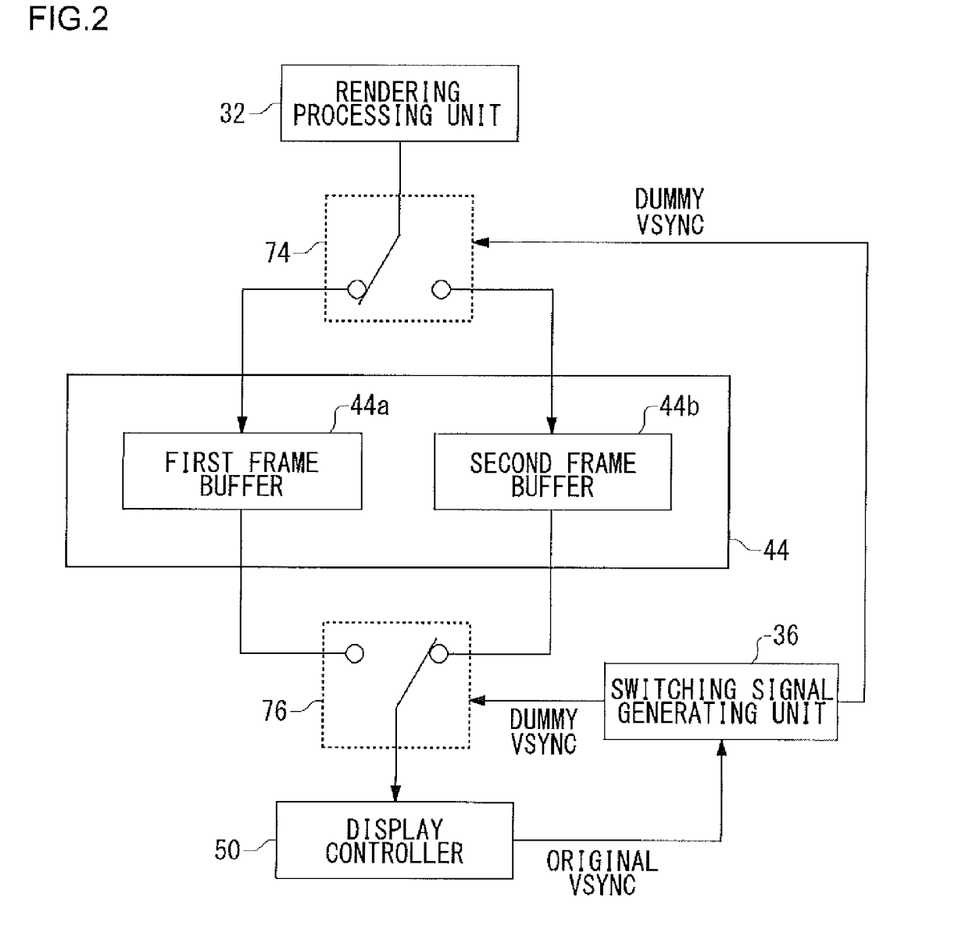
FIG. 2 is a diagram depicting a buffer switching signal generated by the switching signal generating unit of FIG. 1.

FIG. 2 is a diagram depicting a buffer switching signal generated by the switching signal generating unit 36. In the illustrated example, the frame buffer 44 is formed as a double buffer and includes a first frame buffer 44a and a second frame buffer 44b. A switcher 74 at the input of the frame buffer 44 selects a frame buffer (i.e., the first frame buffer 44a or the second frame buffer 44b) in which to write rendering data by the rendering processing unit 32.

When the operation of writing rendering data for one frame in the selected frame buffer is completed, the switcher 74 at the input switches to the other frame buffer in which to write rendering data by the rendering processing unit 32. This causes the rendering data for the subsequent frame to be written in the other frame buffer.

A switcher 76 at the output of the frame buffer 44 selects a frame buffer (i.e., the first frame buffer 44a or the second frame buffer 44b) from which the display controller 50 reads image data.

The display controller 50 supplies the vertical synchronizing signal to the switching signal generating unit 36. The switching signal generating unit 36 generates a buffer switching signal for switching the frame buffer and supplies the signal to the switcher 44 at the input of the frame buffer 44 and the switcher 76 at the output thereof.

The switcher 74 at the input of the frame buffer 44 switches rendering data is to be written by the rendering processing unit 32 from the current frame buffer in which the data is currently written to the other buffer, in accordance with a buffer switching signal from the switching signal generating unit 36.

The switcher 76 at the output of the frame buffer 44 switches from the frame buffer from which the data is currently read to the other frame buffer for selection of the buffer from which to read data by the display controller 50, in accordance with a buffer switching signal from the switching signal generating unit 36. Subsequent scanning by the display controller 50 is performed in the other frame buffer.

When the vertical synchronization frequency assumed by the graphics processor 30 does not match the actual vertical synchronization frequency of the display 60, the switching signal generating unit 36 generates a buffer switching signal at the vertical synchronization frequency assumed by the graphics processor 30. The buffer switching signal generated at the vertical synchronization frequency assumed by the graphics processor 30 will be referred to as "a dummy vertical synchronizing signal (a dummy VSYNC)". The vertical synchronizing signal generated by the display controller 50 at the vertical synchronization frequency of the display 60 will be referred to as "an original vertical synchronizing signal (original VSYNC)".

For example, it will be assumed that the vertical synchronization frequency of the display 60 is 50 Hz and the vertical synchronization signal assumed by the graphics processor 30 is 60 Hz. The display controller 50 supplies the original vertical synchronizing signal to the switching signal generating unit 36 at 50 Hz, the vertical synchronization frequency of the display 60. However, the switching signal generating unit 36 generates a dummy vertical synchronizing signal at 60 Hz, the vertical synchronization frequency assumed by the graphics processor 30. With this, the rendering processing unit 32 creates rendering data for one frame in the frame buffer, by switching between the first frame buffer 44a and the second frame buffer 44b, timed by the dummy vertical synchronizing signal, i.e., at every 1/60 second. The display controller 50 also switches between the first frame buffer 44a and the second frame buffer 44b, timed by the dummy vertical synchronizing signal, i.e., at every 1/60 second, and refers to the selected buffer.

It should be noted that the display controller 50 merely switches between the first frame buffer 44a and the second frame buffer 44b to select the buffer from which to read rendering data at the vertical synchronization frequency of 60 Hz assumed by the graphics processor 30 and that the controller 50 scans a screen data for the display 60 at the actual vertical synchronization frequency of 50 Hz of the display 60. In other words, the display controller 50 reads rendering data by switching between frame buffers from which to read every 1/60 second, in accordance with the vertical synchronization frequency assumed by the graphics processor 30 and supplies rendering data for one frame to the display 60 every 1/50 second, in accordance with the actual vertical synchronization frequency of the display 60.

A description will now be given of display control by the rendering processing apparatus 100 having the aforementioned structure. A description will be given, with reference to FIGS. 3A-3C, of a display control operation performed when the actual vertical synchronization frequency of the display 60 and the vertical synchronization frequency assumed by the graphics processor 30 match. A description will then be given, with reference to FIGS. 4A-4D, of a display control operation performed when the actual vertical synchronization frequency of the display 60 and the vertical synchronization frequency assumed by the graphics processor 30 do not match.

Figure 3A:
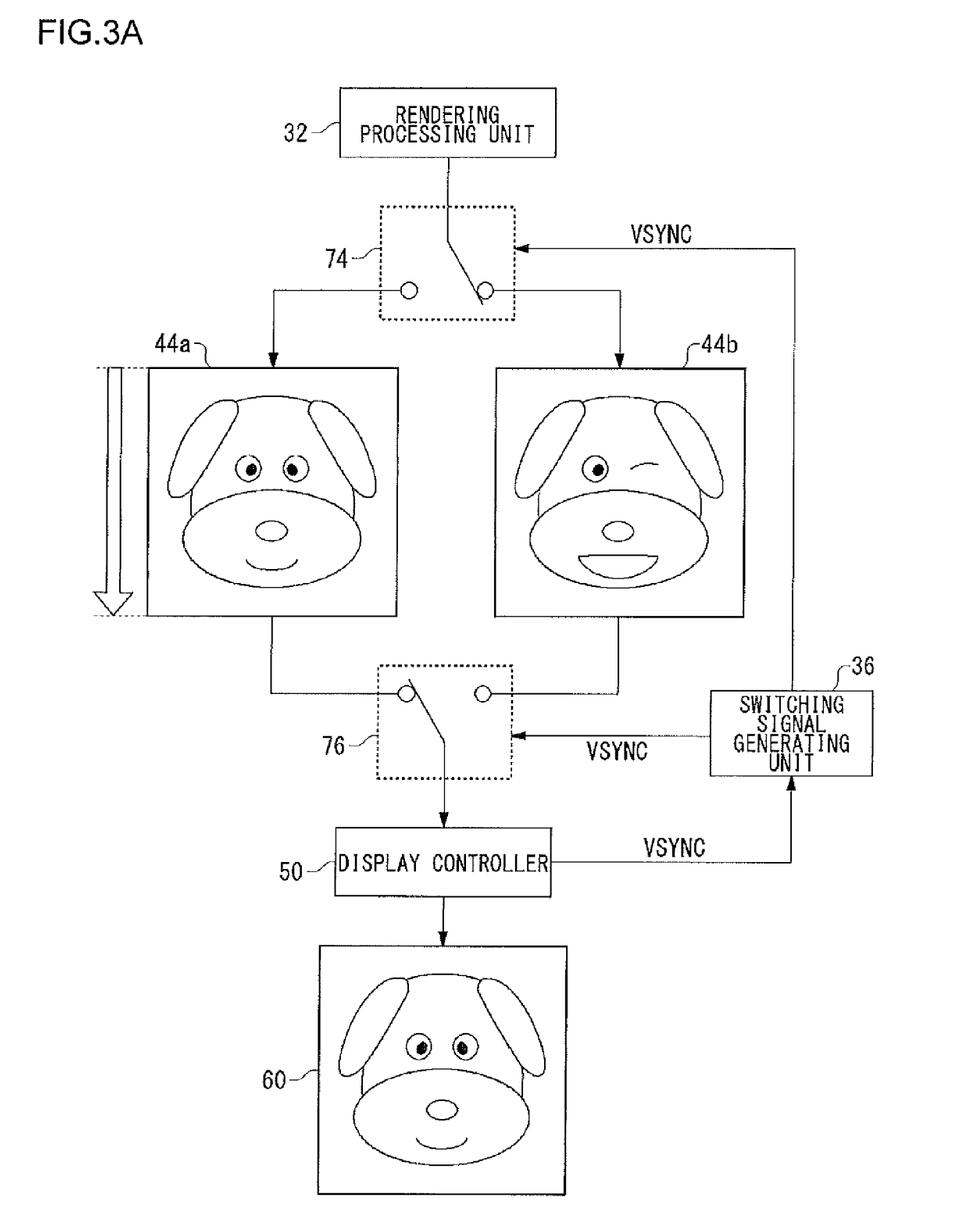
FIG. 3A depicts a display control operation performed when the vertical synchronization frequency of the display and the vertical synchronization frequency assumed by the graphics processor match.

Reference is made to FIG. 3A. The switching signal generating unit 36 is supplied with the original vertical synchronizing signal from the display controller 50. Since the actual vertical synchronization frequency of the display 60 and the vertical synchronization frequency assumed by the graphics processor 30 match, the switching signal generating unit 36 generates a buffer switching signal at the vertical synchronization frequency of the display 60 and supplies the signal to the switcher 74 at the input of the frame buffer 44 and the switcher 76 at the output.

In response to the buffer switching signal, the display controller 50 switches to first frame buffer 44a for selection of the buffer from which to read. The controller 50 reads out a frame image (referred to as "the first frame image") held in the first frame buffer 44a from the first line through the last line and displays the image on the display 60. Meanwhile, the rendering processing unit 32 switches to the second buffer 44b for selection of the buffer in which to write. The unit 32 writes the second frame image in the second frame buffer 44b while the display controller 50 is reading the frame image from the first frame buffer 44a.

Figure 3B:
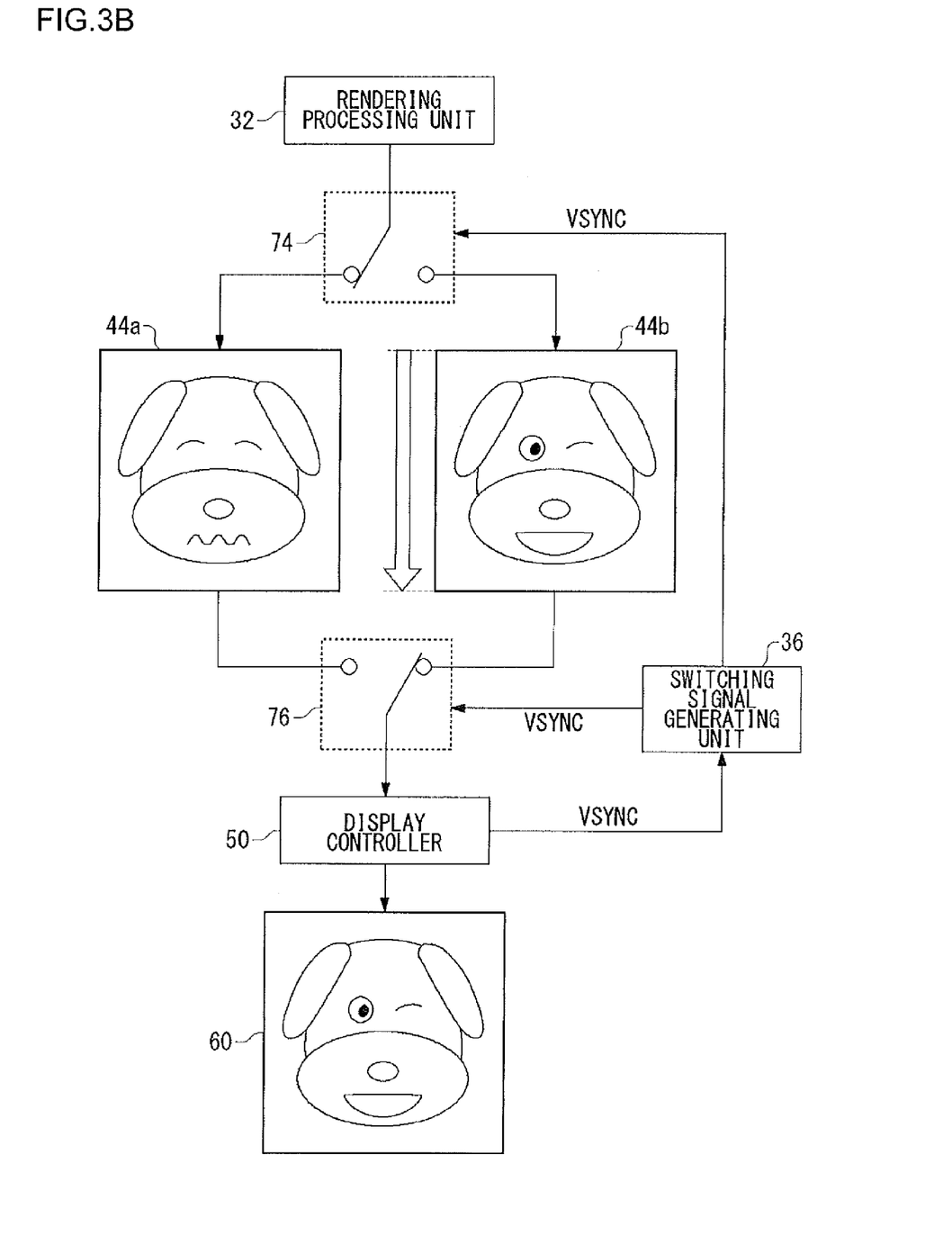
FIG. 3B depicts a display control operation performed when the vertical synchronization frequency of the display and the vertical synchronization frequency assumed by the graphics processor match.

FIG. 3B shows the operation performed when the buffer switching signal is generated for a second time. The switching signal generating unit 36 supplies the second buffer switching signal to the switcher 74 at the input of the frame buffer 44 and the switcher 76 at the output so as to switch the path for input and output through the frame buffer 44.

In response to the switching operation responsive to the second buffer switching signal, the display controller 50 reads the second frame image held in the second frame buffer 44b from the first line through the last line and displays the image on the display 60. Meanwhile, the rendering processing unit 32 writes the third frame image in the first frame buffer 44a while the display controller 50 is reading the second frame image from the second frame buffer 44b.

Figure 3C:
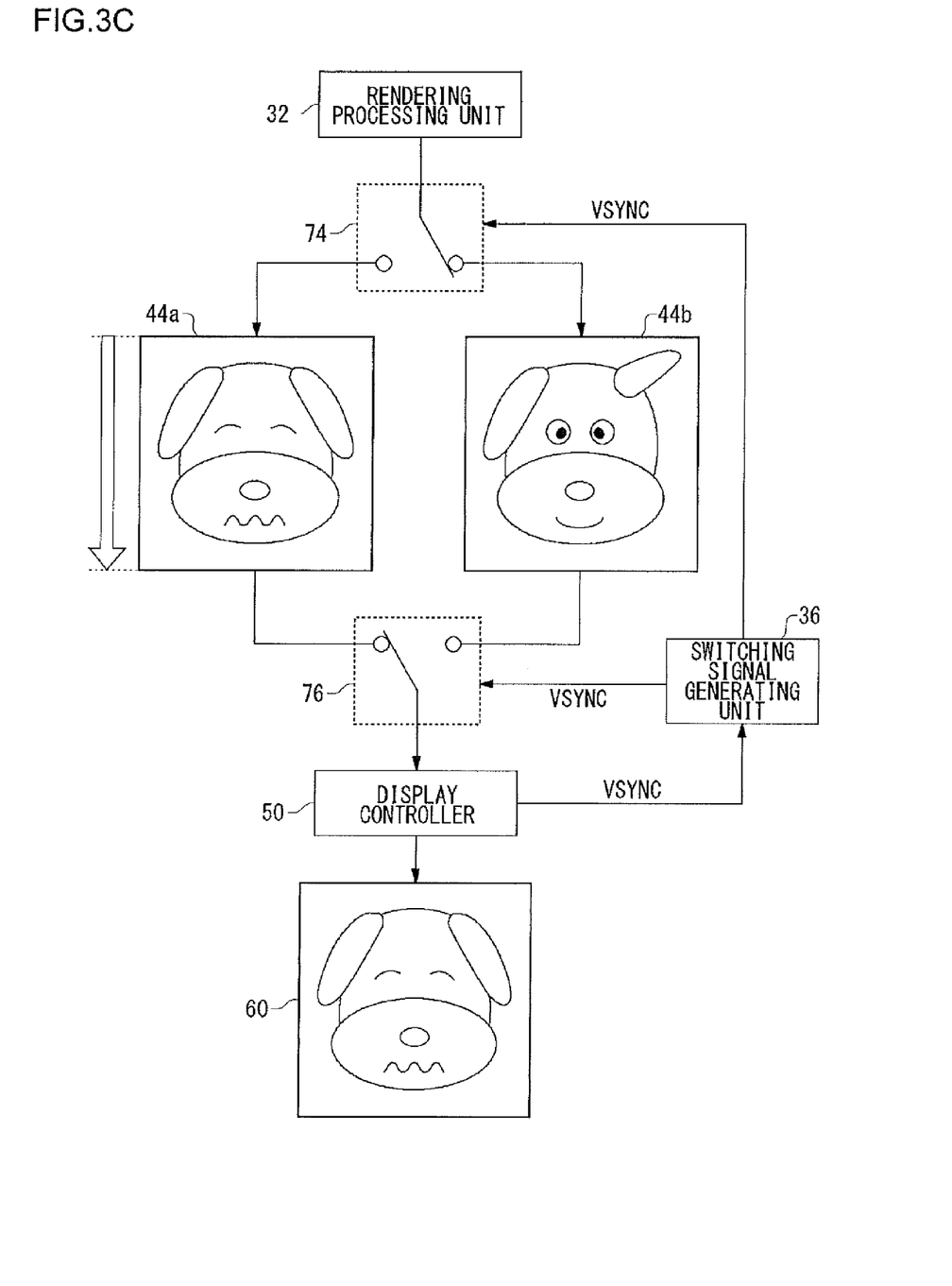
FIG. 3C depicts a display control operation performed when the vertical synchronization frequency of the display and the vertical synchronization frequency assumed by the graphics processor match.

FIG. 3C shows the operation performed when the buffer switching signal is generated for a third time. The switching signal generating unit 36 supplies the third buffer switching signal to the switcher 74 at the input of the frame buffer 44 and the switcher 76 at the output so as to switch the path for input and output through the frame buffer 44.

In response to the switching operation responsive to the third buffer switching signal, the display controller 50 reads the third frame image held in the first frame buffer 44a from the first line through the last line and displays the image on the display 60. Meanwhile, the rendering processing unit 32 writes the fourth frame image in the second frame buffer 44b while the display controller 50 is reading the third frame image from the first frame buffer 44a.

As shown in FIGS. 3A-3C, if the frame rate assumed by the graphics processor 30 in the rendering operation matches the refresh rate of the display 60, the switching signal generating unit 36 may generate a buffer switching signal at the vertical synchronization frequency supplied from the display controller 50 so as to switch the path of input and output through the frame buffer 44.

A description will be given, with reference to FIGS. 4A-4D, of a method of switching the path for input and output through the frame buffer 44 when the frame rate assumed by the graphics processor 30 in the rendering operation and the refresh rate of the display 60 do not match.

The switching signal generating unit 36 is supplied with the original vertical synchronizing signal from the display controller 50. Since the vertical synchronization frequency of the display 60 and the vertical synchronization frequency assumed by the graphics processor 30 do not match, the switching signal generating unit 36 generates a dummy vertical synchronizing signal at the vertical synchronization frequency assumed by the graphics processor 30 and supplies the signal to the switcher 74 at the input of the frame buffer 44 and the switcher 76 at the output.

Figure 4A:
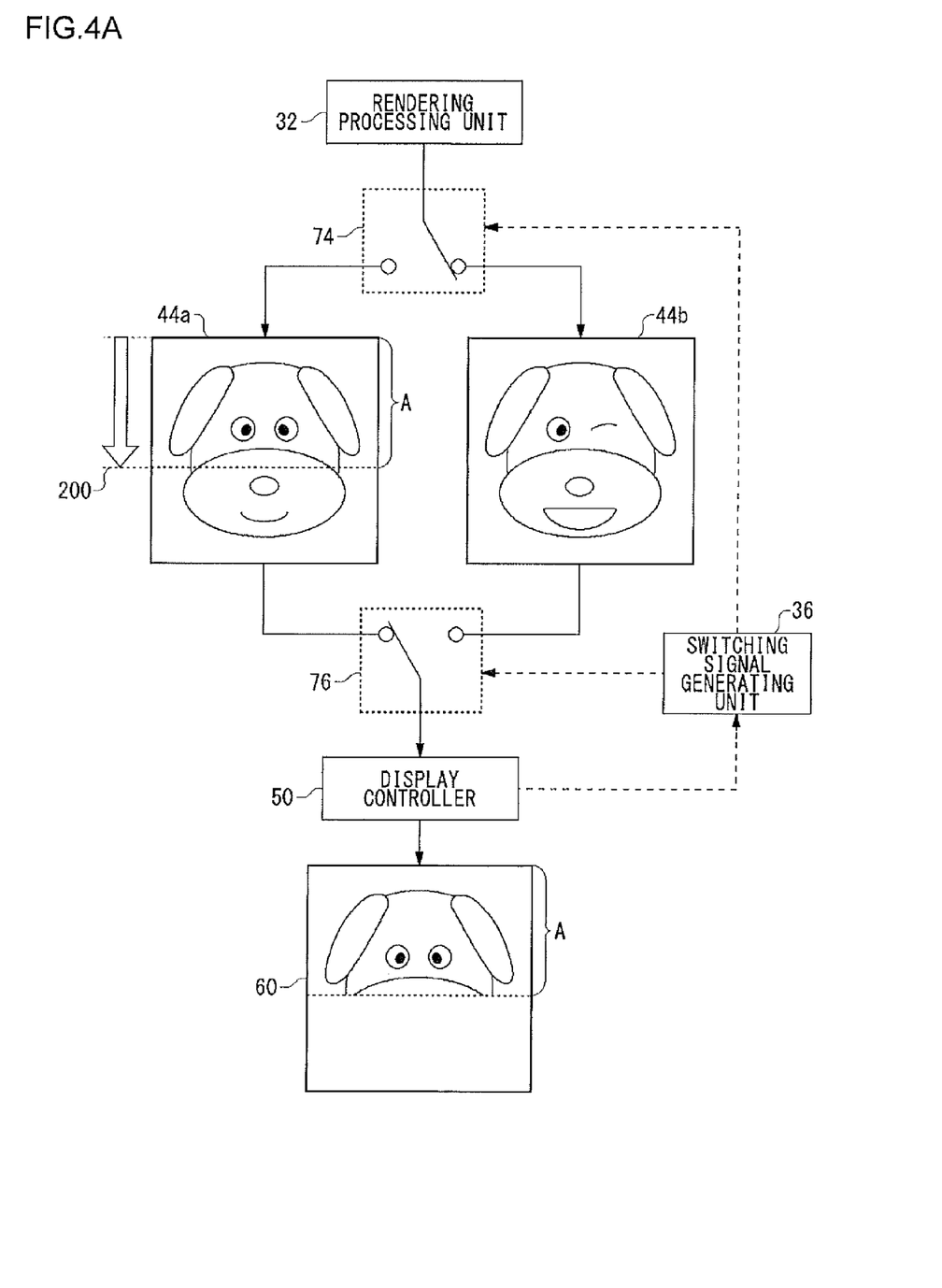
FIG. 4A depicts a display control operation performed when the vertical synchronization frequency of the display and the vertical synchronization frequency assumed by the graphics processor do not match.

FIG. 4A shows an operation performed after the first dummy vertical synchronizing signal is supplied from the switching signal generating unit 36 until the second dummy vertical synchronizing signal is supplied. The display controller 50 scans the first line of the first frame image held in the first frame buffer 44a and proceeds sequentially so as to display the image on the display 60. The dots (numeral 200) indicate a scan line scanned immediately before the second dummy vertical synchronizing signal is supplied from the switching signal generating unit 36. Since the buffer from which to read is switched at the scan line, the scan line will be referred to as "a buffer switching line".

The display 60 displays an area (the portion indicated by A in the figure) between the first line and the first buffer switching line 200 of the first frame image held in the first frame buffer 44a. Meanwhile, the rendering processing unit 32 writes the second frame image in the second frame buffer 44b while the display controller 50 is reading the first frame image from the first frame buffer 44a.

Since the actual vertical synchronization frequency of the display 60 (e.g., 50 Hz) and the vertical synchronization frequency assumed by the graphics processor 30 (e.g., 60 Hz) do not match, the switching signal generating unit 36 generates a dummy vertical synchronizing signal when the first frame buffer 44a has been scanned as far as the buffer switching line 200 of the frame image.

Figure 4B:
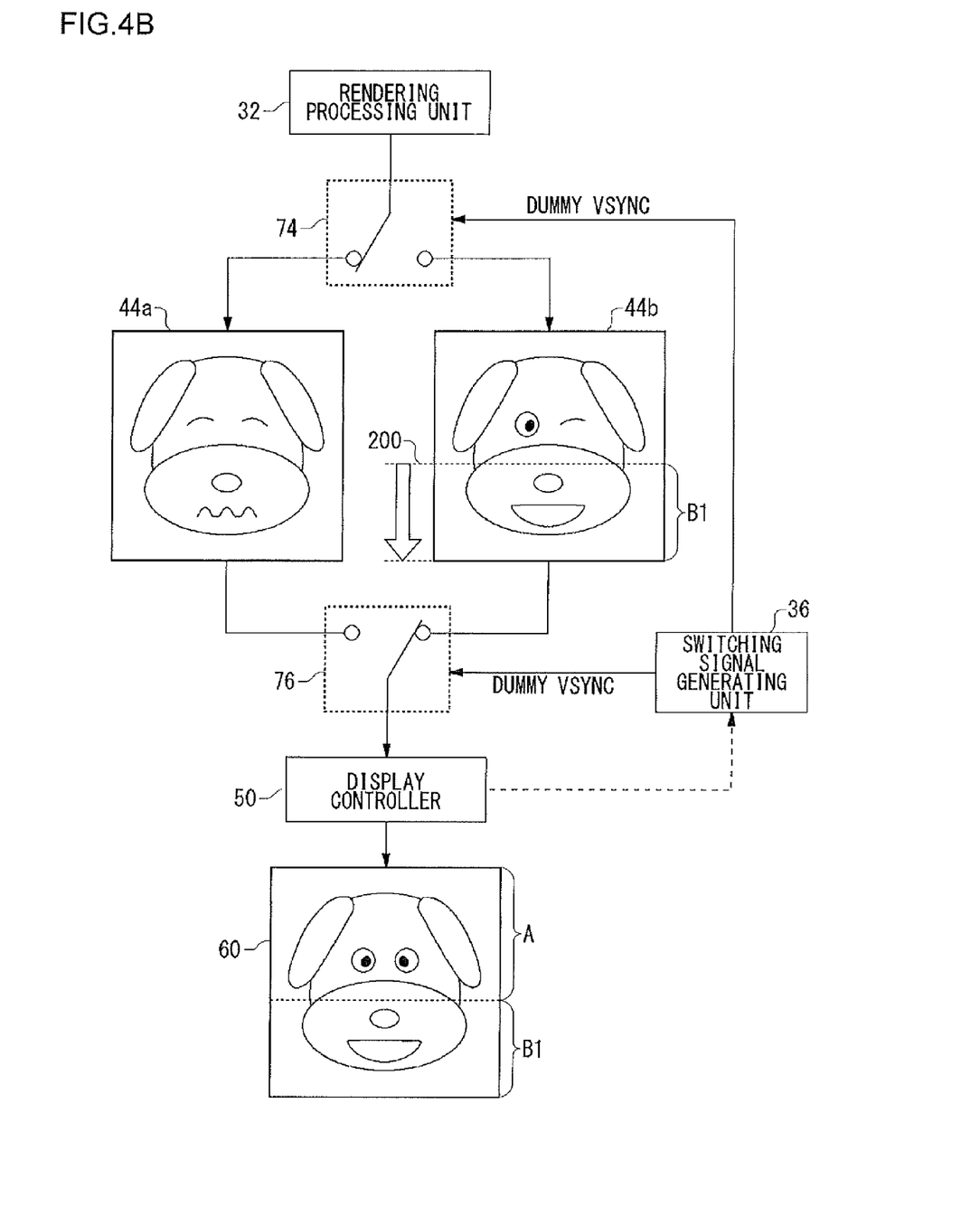
FIG. 4B depicts a display control operation performed when the vertical synchronization frequency of the display and the vertical synchronization frequency assumed by the graphics processor do not match.

FIG. 4B shows an operation performed after the second dummy vertical synchronizing signal is generated from the switching signal generating unit 36. As a result of the dummy vertical synchronizing signal being supplied from the switching signal generating unit 36 to the switchers 74 and 76, the buffer to be read by the display controller 50 is switched to the second frame buffer 44b and the buffer in which to write data by the rendering processing unit 32 is switched to the first buffer 44a.

The display controller 50 scans an area (the portion indicated by B1 in the figure) between the buffer switching line 200 and the last line of the second frame image held in the second frame buffer 44b and displays the image on the display 60. Meanwhile, the rendering processing unit 32 writes the third frame image in the first frame buffer 44a while the display controller 50 is reading the frame image from the second frame buffer 44b.

The point of time at which the second frame image held in the second frame buffer 44b has been scanned as far as the last line and the display 60 has displayed the last line of the screen concurs with the generation of the original vertical synchronizing signal by the display controller 50.

Figure 4C:
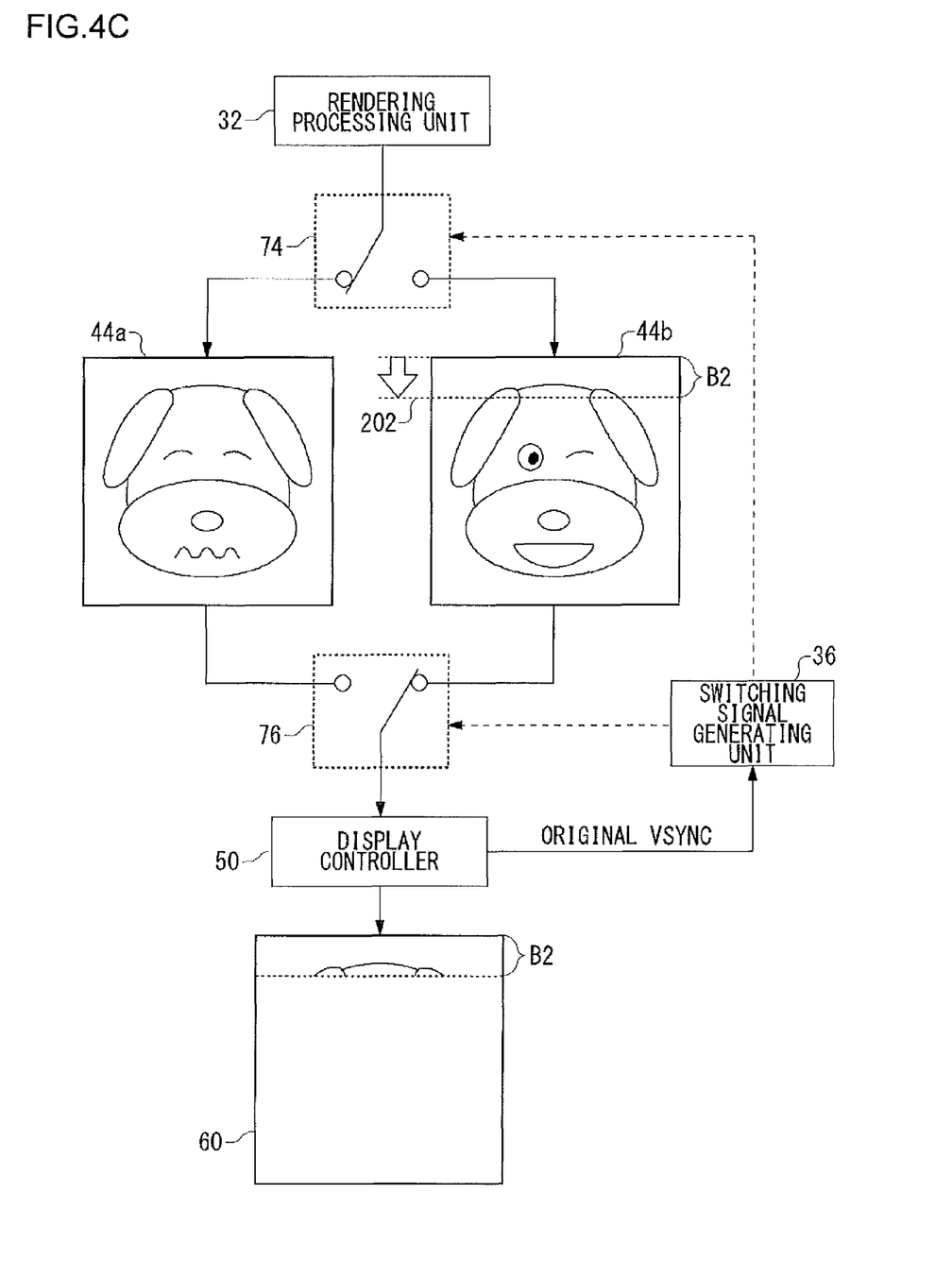
FIG. 4C depicts a display control operation performed when the vertical synchronization frequency of the display and the vertical synchronization frequency assumed by the graphics processor do not match.

FIG. 4C shows an operation performed after the original vertical synchronizing signal is generated by the display controller 50.

When the display controller has scanned the second frame image held in the second frame buffer 44b as far as the last line, the controller 50 returns to the first line of the second frame image and starts scanning the image.

The display controller 50 starts scanning the first line of the second frame image held in the second frame buffer 44*b* and proceeds sequentially so as to display the image on the display 60. It is assumed that the third dummy vertical synchronizing signal is generated by the switching signal generating unit 36 when the second frame image has been scanned as far as the dotted line (numeral 202) (second buffer switching line).

Figure 4D:
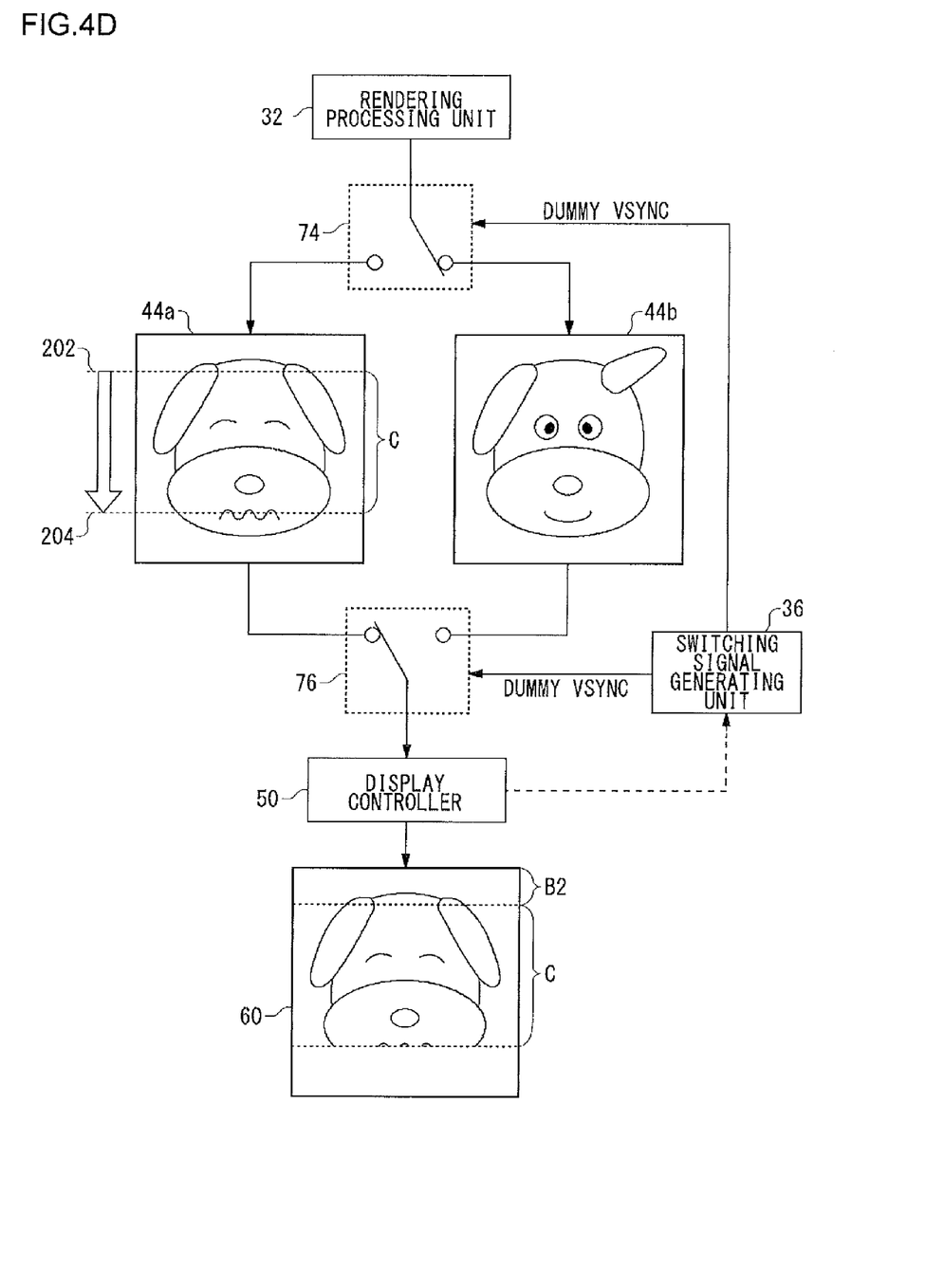
FIG. 4D depicts a display control operation performed when the vertical synchronization frequency of the display and the vertical synchronization frequency assumed by the graphics processor do not match.

FIG. 4D shows an operation performed after the third dummy vertical synchronizing signal is generated by the switching signal generating unit 36. The third dummy vertical synchronizing signal causes the buffer to be read by the display controller 50 to be switched to the first frame buffer 44*a* and causes the buffer in which to write data by the rendering processing unit 32 to be switched to the second frame buffer 44*b*.

The display controller 50 scans an area (the portion indicated by C in the figure) between the second buffer switching line 202 and the third buffer switching line 204 of the third frame image held in the first frame buffer 44*a* and displays the image on the display 60. Meanwhile, the rendering processing unit 32 writes the fourth frame image in the second frame buffer 44*b* while the display controller 50 is reading the frame image from the first frame buffer 44*a*.

Figure 5:
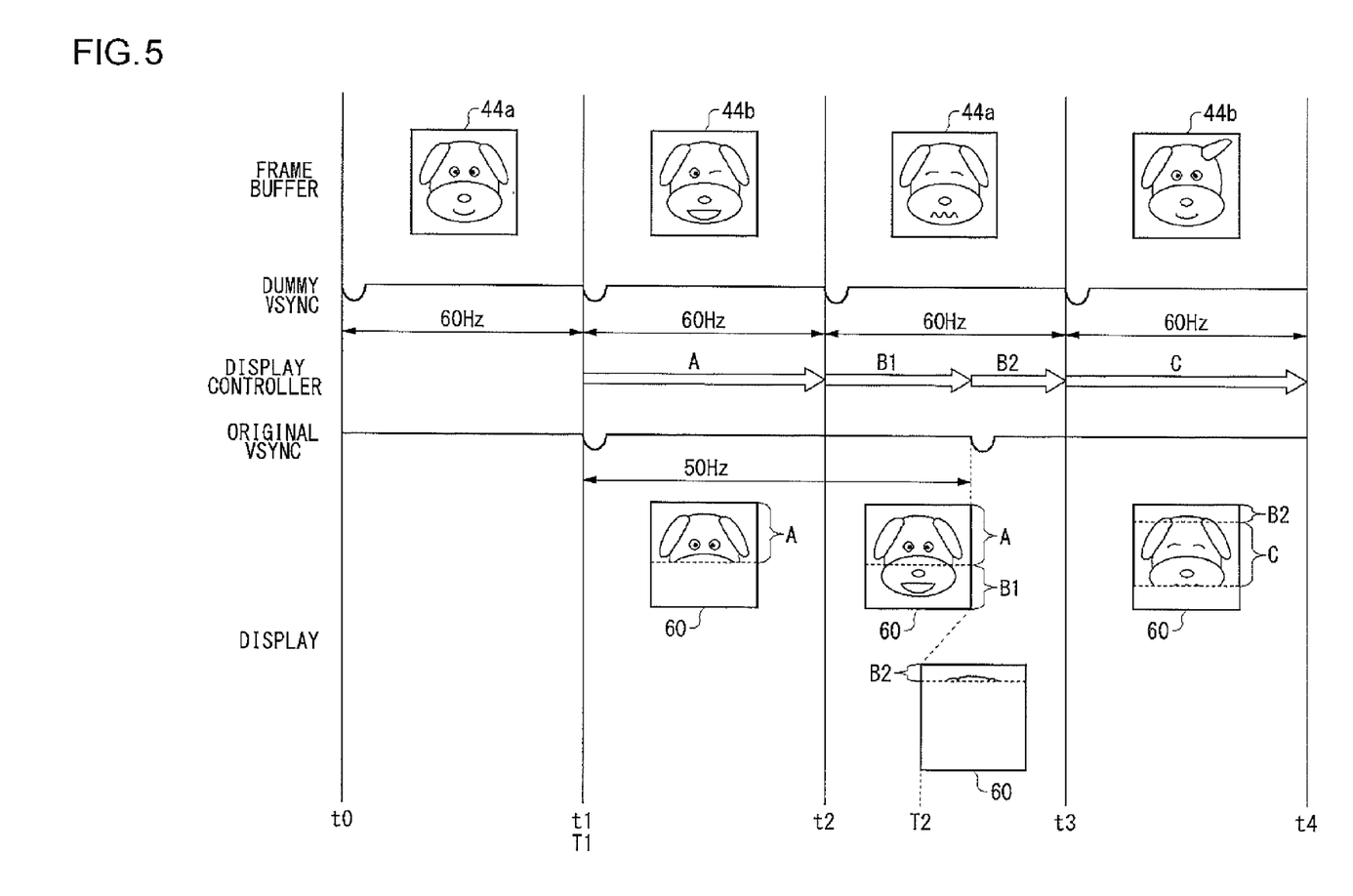
FIG. 5 is a sequence diagram depicting display control operations in FIGS. 4A-4D.

FIG. 5 is a sequence diagram depicting display control operations shown in FIGS. 4A-4D. It is assumed in the illustration that the actual vertical synchronization frequency of the display 60 is 50 Hz and the vertical synchronization frequency assumed by the graphics processor 30 is 60 Hz.

The dummy vertical synchronizing signal at 60 Hz and the original vertical synchronizing signal at 50 Hz are illustrated using the horizontal axis to indicate time. At time t0, t1, t2, t3, and t4, the zeroth through fourth dummy vertical synchronizing signals are generated. At time T1 and T2, the first and second original vertical synchronizing signals are generated. It is assumed that time t1, at which the first dummy vertical synchronizing signal is generated, and time T1, at which the original vertical synchronizing signal is generated, coincide.

The rendering processing unit 32 writes the first through fourth frame images, by switching between the first frame buffer 44*a* and the second frame buffer 44*b* in accordance with the dummy vertical synchronizing signal at 60 Hz. The display controller 50 reads rendering data by switching from the first frame buffer 44*a* or the second frame buffer 44, switching between the buffers in concurrence with the generation of the dummy vertical synchronizing signal at 60 Hz. For example, the controller 50 reads out rendering data from the first frame buffer 44*a* in an interval between t1 and t2. At time t2, the controller 50 switches to the second frame buffer 44*b*. In an interval between t2 and t3, the controller 50 reads out rendering data from the second frame buffer 44*b*.

Before the display controller 50 scans the data as far as the last line of the screen, the frame buffer from which to read is switched in concurrence with the generation of the dummy vertical synchronizing signal. Referring to FIG. 5, the buffer from which to read is switched from the first buffer 44*a* to the second buffer 44*b* at time t2. At time t3, the buffer from which to read is switched from the second buffer 44*b* to the first buffer 44*a*. The display controller 50 completes scanning the last line of the screen in concurrence with the generation of the original vertical synchronizing signal, switches the screen, returns to the first line for scanning. Referring to FIG. 5, at time T2, the controller reaches the last line of the screen, switches the screen, scans the first line, and proceeds as previously.

An interval between time t1, at which the first dummy vertical synchronizing signal is generated, and time t2, at which the second dummy vertical synchronizing signal is generated, is represented by FIG. 4A. Data for the area A of the first frame image is read by the display controller 50 from the first frame buffer 44*a* and displayed in an area of the display 60 between the first line and the buffer switching line. At time t2, at which the second dummy vertical synchronizing signal is generated, the frame buffer from which to read is switched from the first frame buffer 44*a* to the second frame buffer 44*b*.

An interval between time t2, at which the second dummy vertical synchronizing signal is generated, and time T2, at which the second original vertical synchronizing signal is generated, is represented by FIG. 4B. Data for the area B1 of the second frame image is read by the display controller 50 from the second frame buffer 44*b* and displayed in an area of the display 60 between the previous buffer switching line and the last line. At time T2, at which the second original vertical synchronizing signal is generated, the screen of the display 60 is switched so that scanning starts at the first line.

An interval between time T2, at which the second original vertical synchronizing signal is generated, and time t3, at which the third dummy vertical synchronizing signal is generated, is represented by FIG. 4C. Data for the area B2 of the second frame image is read by the display controller 50 from the second frame buffer 44*b* and displayed in an area of the display 60 between the first line and the buffer switching line. At time t3, at which the third dummy vertical synchronizing signal is generated, the frame buffer from which to read is switched from the second frame buffer 44*b* to the first frame buffer 44*a*.

An interval between time t3, at which the third dummy vertical synchronizing signal is generated, and time t4, at which the fourth dummy vertical synchronizing signal is generated, is represented by FIG. 4D. Data for the area C of the third frame image is read by the display controller 50 from the first frame buffer 44*a* and displayed in an area of the display 60 between the previous buffer switching line and the next buffer switching line.

As shown in FIG. 5, according to the embodiment, the display controller 50 switches the frame buffer from which to read rendering data at the vertical synchronization frequency assumed by the graphics processor 30 in the rendering operation instead of the actual vertical synchronization frequency of the display 60. In this way, moving images can be displayed on the display 60 without disregarding the frame rate of moving images produced by the graphics processor 30 operated at a frequency different from the vertical synchronization frequency of the display 60. Occurrence of unnaturally reproduced moving images associated with frequency conversion is minimized.

The graphics processor 30 need not change the frame rate for rendering in adaptation to the vertical synchronization frequency of the display 60. The graphics processor 30 may perform a rendering operation by assuming a standard vertical synchronization frequency. This also eliminates the need for a converter for converting into the vertical synchronization frequency of the display 60.

Figure 6:
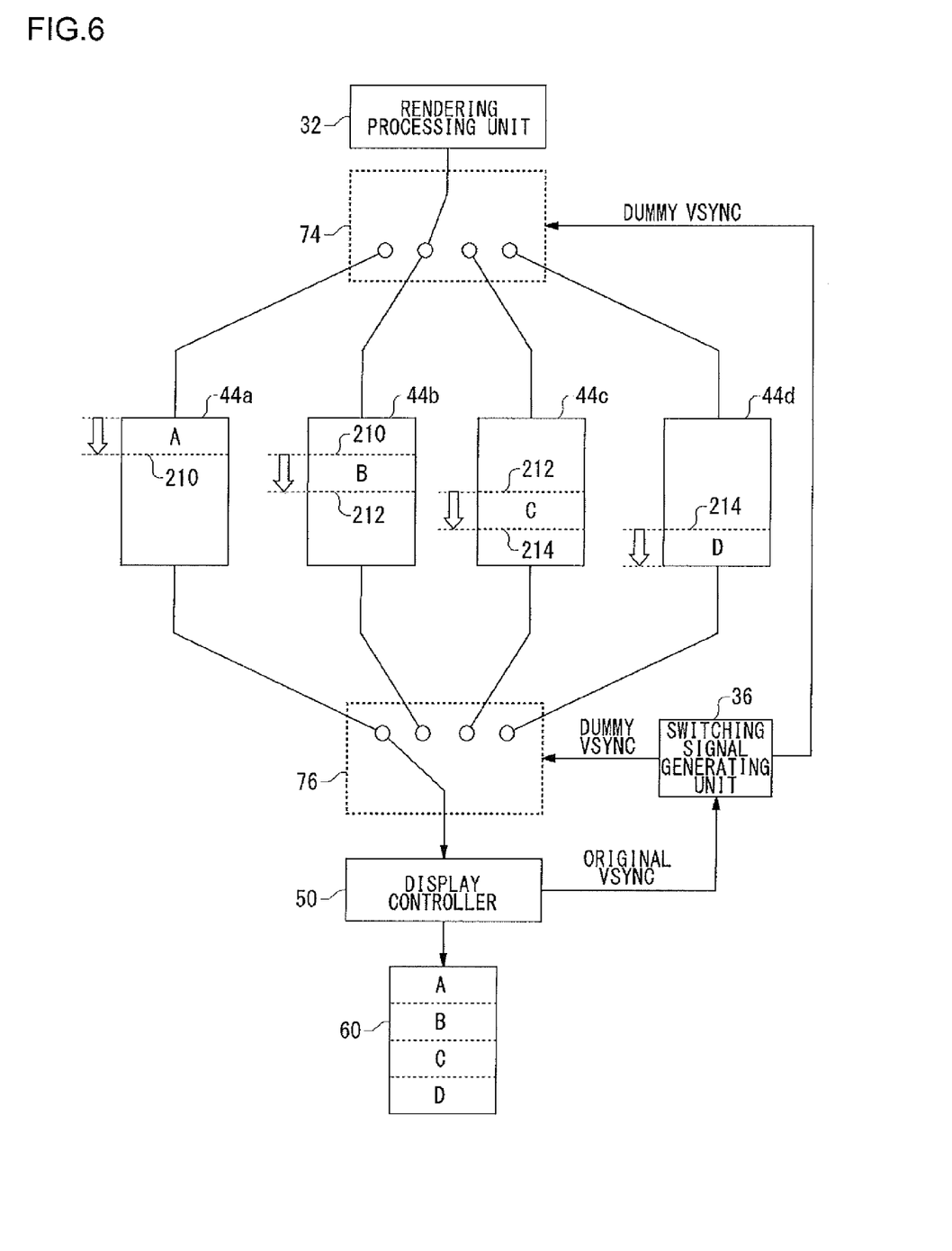
FIG. 6 depicts how the embodiment is applied to high frame rate rendering.

FIG. 6 depicts how the embodiment is applied to high frame rate rendering. The rendering processing unit 32 generates rendering data at a high frame rate of 240 Hz. The display 60 has a vertical synchronization frequency of 60 Hz. The switching signal generating unit 36 is supplied with the original vertical synchronizing signal at 60 Hz from the display controller 50 and supplies the dummy vertical synchronizing signal at 240 Hz to the switchers 74 and 76.

The rendering processing unit 32 switches between four frame buffers 44a-44d at 240 Hz according to a sequence so as to write rendering data for one frame in each of the frame buffers 44a-44d.

The display controller 50 reads rendering data A between the first line and the first buffer switching line 210 in the first frame buffer 44a, rendering data B between the first switching line 210 and the second buffer switching line 212 in the second frame buffer 44b, rendering data C between the second buffer switching line 212 and the third buffer switching line 214 in the third frame buffer 44c, rendering data D between the third buffer switching line 214 and the last line in the fourth frame buffer 44d, by switching between the four frame buffers 44a-44d according to a sequence. The display controller 50 arranges the data in a screen of the display 60 adapted to switch the screen at 60 Hz.

Three out of four frames may be dropped so as to convert frames produced at 240 Hz into frames at 60 Hz. Simple filtering such as this cannot, however, fully exploit the result of rendering at a high frame rate and will result in poor quality of moving images. In contrast, according to the display control method of the embodiment, a frame is produced by using the four frames in respective portions. Therefore, the quality of moving images is maintained after frequency conversion.

As described, the embodiment properly addresses high frame rate rendering by the graphics processor 30 such that an on-screen image of the display is formed by obtaining image data by switching the frame buffer from which to read in accordance with a dummy vertical synchronizing signal adapted to the high frame rate and by synthesizing images read from the frame buffers. In this way, the results of rendering by the graphics processor 30 at the high frame rate are not left unused and are displayed on the display 60 operated at an ordinary vertical synchronization frequency, thereby preventing the quality of moving images from being lowered unlike the rendering method that simply drops frames.

Given above is a description based on an exemplary embodiment. The embodiment is intended to be illustrative only and it will be obvious to those skilled in the art that various modifications to constituting elements and processes could be developed and that such modifications are also within the scope of the present invention. One such modification will be described.

The description above concerns the case where moving images produced by the graphics processor 30 according to the NTSC system are displayed on the display 60 of the PAL system operated at a different vertical synchronization frequency. The present invention is applicable to other cases including, for example, the display of moving images generated by the graphics processor 30 on displays having a variety of vertical synchronization frequencies for personal computers.

The present invention is applicable to the field of rendering processes.

What is claimed is:

1. A graphics processor operative to supply a buffer switching signal for timing of switching between a plurality of frame buffers, each of which is adapted to hold a frame of rendering data, to a display controller which switchably selects one of the frame buffers according to a sequence, and supplies the rendering data read by scanning the selected frame buffer to a display, wherein the graphics processor determines whether a vertical synchronization frequency which the graphics processor assumes when generating the rendering data frame by frame matches an actual vertical synchronization frequency of the display, and when the frequencies do not match, generates the buffer switching signal at the assumed vertical synchronization frequency, and when the frequencies match, generates the buffer switching signal at the actual vertical synchronization frequency of the display, and wherein the selected frame buffer from which the rendering data is to be read is switched to another frame buffer when the buffer switching signal is received such that the display switches the buffers at the assumed vertical synchronization frequency and a time point of the buffer switch is determined independently from a time of occurrence of a vertical synchronization of the display when the frequencies do not match.

2. A rendering processing apparatus comprising:

a plurality of frame buffers each of which is operative to hold a frame of rendering data;

a rendering processing unit operative to switchably select a frame buffer in which to write rendering data from the plurality of frame buffers according to a sequence, and to generate the rendering data in the selected frame buffer in which to write;

a display controller operative to switchably select a frame buffer from which to read rendering data from the plurality of buffers according to a sequence, and to supply to a display the rendering data read by scanning the selected frame buffer from which to read; and a switching signal generating unit operative to generate a buffer switching signal directing the display controller to switch the frame buffer from which to read, wherein the switching signal generating unit determines whether a frequency of a dummy vertical synchronization signal that is independent of a synchronization signal of the display matches an actual vertical synchronization frequency of the display, and when the frequencies do not match, generates the buffer switching signal at the timing of the dummy vertical synchronization signal, and when the frequencies match, generates the buffer switching signal at the timing of the actual vertical synchronization frequency of the display, and wherein the selected frame buffer from which the rendering data is to be read is switched to another frame buffer when the buffer switching signal is received such that the display switches the buffers at the assumed vertical synchronization frequency and a time point of the buffer switch is determined independently from a time of occurrence of a vertical synchronization of the display when the frequencies do not match.

3. The rendering processing apparatus according to claim 2, wherein the buffer switching signal is also used to direct the rendering processing unit to switch the frame buffer in which to write.

4. The rendering processing apparatus according to claim 2, wherein the switching signal generating unit generates the buffer switching signal at a frequency of a dummy synchronization signal generated at a vertical synchronization frequency which the rendering processing unit assumes when generating rendering data frame by frame.

5. The rendering processing apparatus according to claim 2, wherein the display controller produces one frame for the display by combining rendering data that is scanned from at least two of the plurality of buffers.

6. A rendering processing apparatus comprising:

a plurality of frame buffers each of which is operative to hold a frame of rendering data;

a rendering processing unit operative to switchably select a frame buffer in which to write the rendering data according to a sequence, and to generate the rendering data in the selected frame buffer in which to write;

a display controller operative to switchably select a frame buffer from which to read rendering data according to a sequence, and to supply to a display the rendering data read by scanning the selected frame buffer from which to read; and a switching signal generating unit operative to generate a buffer switching signal directing the display controller to switch the frame buffer from which to read, wherein the switching signal generating unit determines whether a vertical synchronization frequency which the rendering processing unit assumes when generating the rendering data frame by frame matches an actual vertical synchronization frequency of the display, and when the frequencies do not match, generates the buffer switching signal at the assumed vertical synchronization frequency, and when the frequencies match, generates the buffer switching signal at the actual vertical synchronization frequency of the display, and wherein the selected frame buffer from which the rendering data is to be read is switched to another frame buffer when the buffer switching signal is received such that the display switches the buffers at the assumed vertical synchronization frequency and a time point of the buffer switch is determined independently from a time of occurrence of a vertical synchronization of the display when the frequencies do not match.

7. A rendering control method adapted for a display controller, comprising:

switchably selecting one of a plurality of frame buffers, each of which is adapted to hold a frame of rendering data according to a sequence;

supplying the rendering data read by scanning the selected frame buffer to a display;

controlling the timing of switching the frame buffer scanned by the display controller in accordance with a dummy vertical synchronization signal that is independent of a synchronization signal of the display;

determining whether a frequency of the dummy vertical synchronization signal matches a frequency of the synchronization signal of the display;

setting, when the frequencies do not match, the timing of switching to the timing of the dummy vertical synchronization signal wherein a time point of the switching is determined independently from a time of occurrence of a vertical synchronization of the display;

setting, when the frequencies match, the timing of switching to the timing of the synchronization signal of the display, and switching the selected frame buffer from which the rendering data is to be read to another frame buffer when the buffer switching signal is received such that the display switches the buffers at the assumed vertical synchronization frequency when the frequencies do not match.

* * * * *